(12) United States Patent
Shimizu et al.

(10) Patent No.: US 8,242,764 B2
(45) Date of Patent: Aug. 14, 2012

(54) DC-DC CONVERTER HAVING VFM MODE IN WHICH INDUCTOR CURRENT INCREASES AND SWITCHING FREQUENCY DECREASES

(75) Inventors: Shinya Shimizu, Itami (JP); Yuusuke Michishita, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 439 days.

(21) Appl. No.: 12/557,756

(22) Filed: Sep. 11, 2009

(65) Prior Publication Data
US 2010/0066328 A1    Mar. 18, 2010

(30) Foreign Application Priority Data

Sep. 12, 2008    (JP) ................................. 2008-234362

(51) Int. Cl.
*G05F 1/565* (2006.01)
(52) U.S. Cl. ........................................ 323/285; 323/284
(58) Field of Classification Search ........... 323/282–285
See application file for complete search history.

(56) References Cited

U.S. PATENT DOCUMENTS

| | | | |
|---|---|---|---|
| 7,166,993 B2 | 1/2007 | Shimizu et al. | |
| 7,352,160 B2 | 4/2008 | Shimizu et al. | |
| 7,498,785 B2 | 3/2009 | Shimizu et al. | |
| 7,522,432 B2 | 4/2009 | Shimizu | |
| 2007/0247131 A1* | 10/2007 | Sohma | 323/284 |
| 2008/0068869 A1 | 3/2008 | Shimizu | |
| 2008/0169793 A1 | 7/2008 | Okuda et al. | |
| 2008/0278129 A1 | 11/2008 | Shimizu | |

FOREIGN PATENT DOCUMENTS

| | | |
|---|---|---|
| JP | 3647811 | 2/2005 |
| JP | 2006-262646 | 9/2006 |
| JP | 2007-318830 | 12/2007 |
| JP | 2008-72850 | 3/2008 |
| JP | 2008-79378 | 4/2008 |
| JP | 2008-86143 | 4/2008 |
| JP | 2008-172905 | 7/2008 |
| JP | 2008-283807 | 11/2008 |
| JP | 2009-118563 | 5/2009 |
| JP | 4316362 | 5/2009 |

* cited by examiner

*Primary Examiner* — Harry Behm
(74) *Attorney, Agent, or Firm* — Cooper & Dunham LLP (57) ABSTRACT

A non-isolated DC-DC converter that converts a voltage input to an input terminal to output a constant output voltage to a load terminal while switching control mode between a PWM mode and a VFM mode depending on a current output to the load terminal. The DC-DC converter includes an inductor, a switching circuit, and a control circuit. The inductor stores electric energy for supply to the load terminal. The switching circuit switches on and off current flow at a switching frequency to alternately charge and discharge the inductor. The control circuit increases an electric current flowing to the load terminal through the inductor per one operational cycle as the switching frequency decreases during VFM control mode operation.

7 Claims, 6 Drawing Sheets

DC-DC CONVERTER HAVING VFM MODE IN WHICH INDUCTOR CURRENT INCREASES AND SWITCHING FREQUENCY DECREASES

BACKGROUND OF THE INVENTION

1. Technical Field

The present invention relates to a DC-DC converter, and more particularly, to a non-isolated DC-DC converter that can operate in either PWM control mode or VFM control mode depending on load conditions with increased power efficiency during VFM-controlled operation.

2. Discussion of the Background

With currently increasing concern for environmental and ecological issues, there is a growing need for energy-saving electronic devices, particularly those operating with battery-based power supply. Two common approaches to conserving energy in electronic equipment are to reduce power consumed by functional units of the electronic device, and to improve efficiency and reduce energy loss of power circuitry supplying the electronic device.

A non-isolated DC-DC converter is an example of a high-efficiency power supply used in small portable electronic devices, in which an output transistor switches on and off current flow to temporarily store an input energy in an inductor and release the stored energy at a constant voltage higher or lower than that of the input energy.

One major technique used to control operation of a DC-DC converter is pulse width modulation (PWM) control, which adjusts an ON time or duty cycle of a switching transistor with a clock signal having a constant frequency and a variable pulse width or pulse duration. Another control technique commonly used is variable frequency modulation (VFM) control, also referred to as pulse frequency modulation (PFM) control, which adjusts a switching frequency of a switching transistor with a clock signal having a variable frequency and a constant pulse duration. Some VFM control schemes vary a clock frequency seamlessly using a variable oscillator, and others create a variable-frequency signal by skipping pulses in an original pulse train oscillating at a constant frequency.

Typically, power consumed by a DC-DC converter increases in proportion to the switching frequency with which a switching transistor is operated. That fact indicates that with low power supplied to load circuitry, PWM control is less efficient in terms of power consumption than VFM control, since the former constantly switches the output transistor at a fixed frequency whereas the latter can adjust the switching frequency to decrease corresponding to the low-load condition. On the other hand, VFM control is inferior to its counterpart in terms of operational stability, for varying the switching frequency can cause noise and ripple in the output of the DC-DC converter.

To combine the advantages of PWM and VFM control schemes, some conventional voltage regulators incorporate power supply circuitry that can switch control mode between PWM mode and VFM mode. These dual-control mode voltage regulators, operating in VFM control mode under low load and in PWM control mode under high load, provide high power efficiency over a wider range of operating conditions than is possible with a single-control mode power supply.

What is required for good performance of a PWM/VFM-controlled DC-DC converter is to properly determine the timing at which the control mode switches between PWM and VFM modes, and in particular, to synchronize transition of the control mode with transition of the output current so that transition from VFM mode to PWM mode occurs exactly when the output current reaches a threshold value with which the DC-DC converter enters continuous mode operation. Moreover, to obtain even higher efficiency of dual-control mode voltage regulation, it is desirable to set the switching frequency as low as possible during VFM-controlled operation.

Several techniques have been proposed to determine the timing at which a dual-control mode switching transistor switches the control mode from VFM mode to PWM mode according to load conditions.

For example, one conventional method proposes a DC-DC converter that determines the transition timing by monitoring the load condition according to an error amplifier indicating the level of the output voltage. Another conventional method proposes a VFM/PWM-controlled power supply that can switch the control mode by detecting the load condition from an error amplifier output and perform VFM mode control without using a voltage-controlled oscillator.

The conventional methods described above have a fixed ON-time of the switching transistor during VFM-controlled operation, upon which the switching frequency is dependent. This results in difficulty in adjusting the switching frequency during VFM-controlled operation where the VFM/PWM transition occurs with the output current reaching the threshold current.

Thus, what is needed is a dual-control mode DC-DC converter that can smoothly switch control mode from VFM to PWM without causing variations in the output voltage, while improving power efficiency during VFM-controlled operation by reducing the switching frequency under low-load conditions.

BRIEF SUMMARY

This disclosure describes a novel non-isolated DC-DC converter that converts a voltage input to an input terminal to output a constant output voltage to a load terminal while switching control mode between a PWM mode and a VFM mode depending on a current output to the load terminal.

In one aspect of the disclosure, the novel DC-DC converter includes an inductor, a switching circuit, and a control circuit. The inductor stores electric energy for supply to the load terminal. The switching circuit switches on and off current flow at a switching frequency to alternately charge and discharge the inductor. The control circuit increases an electric current flowing to the load terminal through the inductor per one operational cycle as the switching frequency decreases during VFM control mode operation.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, examples and exemplary embodiments of this disclosure are described.

Figure 1:
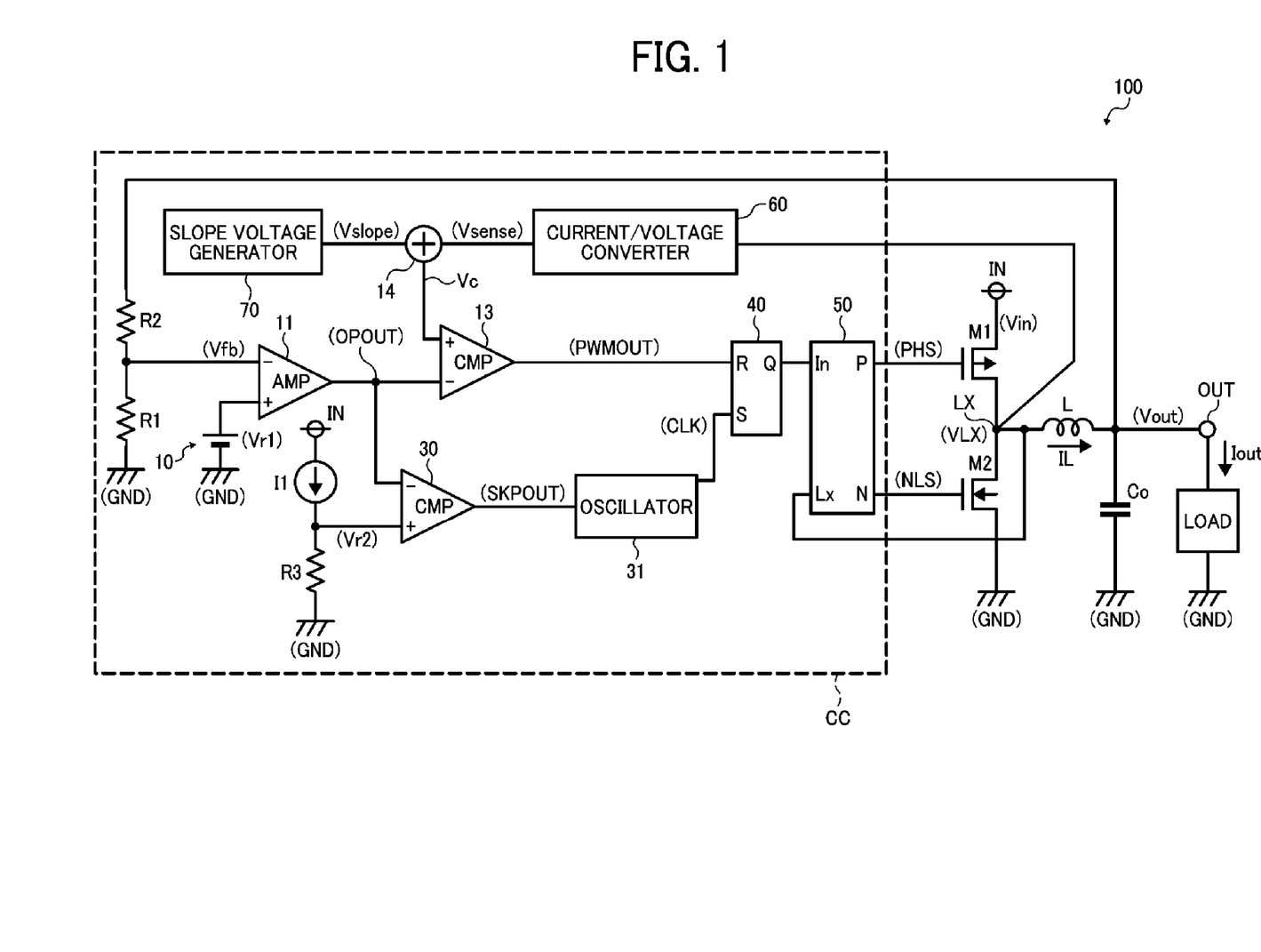
FIG. 1 is a circuit diagram illustrating a non-isolated current-mode-controlled DC-DC converter.

FIG. 1 is a circuit diagram illustrating a non-isolated current-mode-controlled DC-DC converter 100.

As shown in FIG. 1, the DC-DC converter 100 is a step-down or buck voltage regulator with synchronous rectification, which converts a voltage Vin input to an input terminal IN to output a constant voltage Vout lower than the input voltage Vin to an output terminal OUT for supply to a load circuit LOAD.

The DC-DC converter 100 has an output stage formed of a switching transistor M1 and a synchronous rectifier transistor M2, the former being a P-channel metal-oxide semiconductor (PMOS) transistor and the latter an N-channel metal-oxide semiconductor (NMOS) transistor, with a node LX therebetween connected to an inductor L and an output capacitor Co forming a filter circuit.

The operation of the output stage is controlled by a control circuit CC formed of a pair of voltage sensing resistors R1 and R2, a first reference voltage generator 10, an error amplifier 11, a first comparator 13, an adder circuit 14, a current/voltage converter 60, a slope voltage generator 70, a constant current source I1, a resistor R3, a second comparator 30, an oscillator 31, a reset-set (RS) flip-flop 40, and an inverter or switching controller 50.

In the DC-DC converter 100, the output transistors M1 and M2 are connected in series between the input terminal IN and a ground GND, with the node LX therebetween connected to the inductor L. The inductor L is connected between the node LX and the output terminal OUT, and the capacitor Co is connected between the output terminal OUT and the ground GND. The output terminal OUT is connected to the load circuit LOAD, through which an output current Iout flows at the output voltage Vout.

In the control circuit CC of the DC-DC converter 100, the resistors R1 and R2 are connected in series between the output terminal OUT and the ground GND to form a voltage divider. The error amplifier 11 has an inverting input connected to the voltage divider, a non-inverting input connected to the first voltage generator 10, and an output connected to the first and second comparators 13 and 30.

The voltage divider resistors R1 and R2 output a feedback voltage Vfb proportional to the output voltage Vout, while the first voltage generator 10 outputs a first reference voltage Vr1 for comparison with the feedback voltage Vfb. Based on a difference between the two input voltages Vfb and Vr1, the error amplifier 11 outputs an amplified error voltage OPOUT at its output terminal, which increases as the output voltage Vout decreases, and decreases as the output voltage Vout increases.

The current/voltage converter 60 is connected to the inductor node LX. The adder circuit 14 is connected between the current/voltage converter 60 and the slope voltage generator 70. The comparator 13 has an inverting input connected to the output of the error amplifier 11, and a non-inverting input connected to the adder circuit 14.

The current/voltage converter 60 generates a current-sensing voltage Vsense by amplifying a difference between the input voltage Vin and a nodal voltage VLX at the inductor node LX, which is equivalent to the voltage between drain and source terminals of the switching transistor M1. Since the transistor M1 has a constant ON-resistance irrespective of a current flowing through its drain terminal, the drain-to-source voltage of the transistor M1 is proportional to the drain current, which is substantially equivalent to a current IL flowing through the inductor L. The amplified voltage Vsense thus obtained is proportional to the inductor current IL.

The slope voltage generator 70 generates a sawtooth slope voltage Vslope for addition to the current-sensing voltage Vsense, which provides slope compensation to prevent subharmonic oscillation. The slope voltage Vslope is added to the current-sensing voltage Vsense by the adder circuit 14 to generate a current-feedback ramp voltage Vc substantially proportional to the inductor current IL.

Receiving the error voltage OPOUT at one input and the ramp voltage Vc at the other input, the first comparator 13 compares the voltages Vc and OPOUT against each other to generate a pulse width modulation signal PWMOUT for output to the RS flip-flop 40, which goes high when the voltage Vc exceeds OPOUT, and low when the voltage Vc falls to OPOUT or below.

The constant current source I1 and the resistor R3 are connected in series between the input terminal IN and the ground GND. The second comparator 30 has an inverting input connected to the output of the error amplifier 11, a non-inverting input connected to a node between the constant current source I1 and the resistor R3, and an output connected to the oscillator 31.

The series circuit of the constant current source I1 and the resistor R3 generates a constant, second reference voltage Vr2 at the node therebetween for comparison with the error voltage OPOUT. By comparing the error amplifier output OPOUT against the reference voltage Vr2, the comparator 30 generates an oscillator enable signal SKPOUT for output to the oscillator 31, which goes low when the voltage OPOUT exceeds Vr2, and high when the voltage OPOUT falls to Vr2 or below.

The oscillator 31 provides a clock signal CLK to the RS flip-flop 40, which is pulsed with a predetermined duration when the enable signal SKPOUT goes low, continues oscillation at a predetermined frequency when the enable signal SKPOUT remains low, and stops oscillation when the enable signal SKPOUT goes high.

The RS flip-flop 40 has a reset or "R" input connected to the first comparator 13, a set or "S" input connected to the oscillator 31, and a non-inverting or "Q" output connected to the controller 50. The controller 50 has a first input In connected to the flip-flop Q output, a second input Lx connected to the inductor node LX, a first output P connected to the gate of the switching transistor M1, and a second output N connected to the gate of the synchronous rectifier transistor M2.

Receiving the pulse signal PWMOUT at the R input and the clock signal CLK at the S input, the RS flip-flop 40 causes its Q output to go high when the signal CLK goes high, and to go low when the signal PWMOUT goes high. The switching controller 50 provides first and second control signals PHS and NLS, respectively, to control operation of the respective transistors M1 and M2 according to the status of the first and second input terminals In and Lx.

In such a configuration, the DC-DC converter 100 can control operation of the switching transistor M1 either in a variable frequency modulation (VFM) mode, also referred to as pulse frequency modulation (PFM) mode, or in a pulse width modulation (PWM) mode depending on the current Iout output to the load circuit LOAD.

Figure 2:
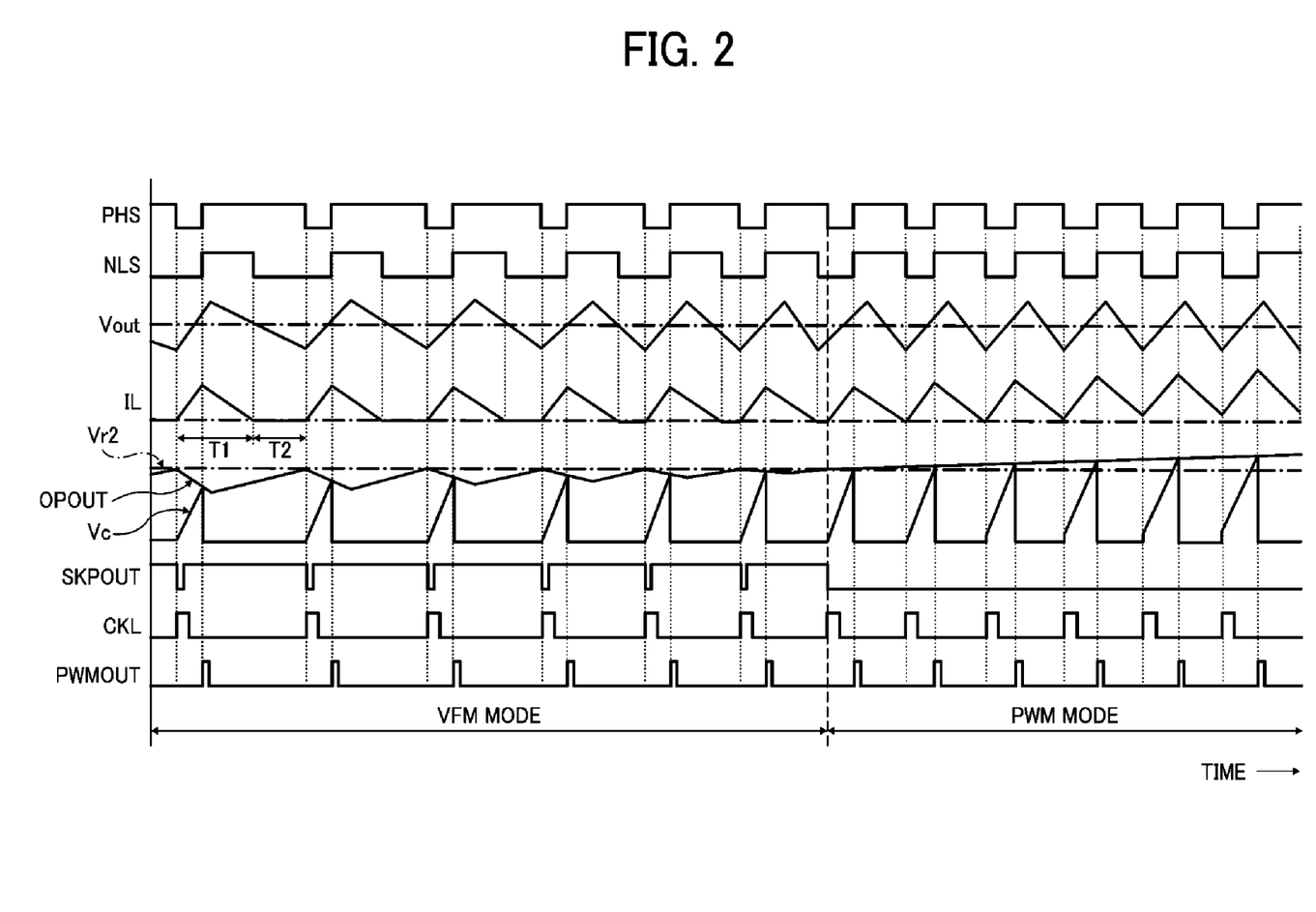
FIG. 2 is a timing diagram showing waveforms of signals in the DC-DC converter of FIG. 1 operated when a control mode switches from VFM mode to PWM mode.

FIG. 2 is a timing diagram showing waveforms of the signals in the DC-DC converter 100 operated when the control mode switches from VFM mode to PWM mode.

During operation in VFM control mode, the output current Iout supplied to the load circuit LOAD is relatively low, so that the error voltage OPOUT output by the error amplifier 11 generally remains below the second reference voltage Vr2. The output voltage Vout gradually decreases as the output capacitor Co discharges stored energy to the output terminal OUT to supply the load circuit LOAD, and the error voltage OPOUT increases inversely with the output voltage Vout.

When the error voltage OPOUT exceeds the second reference voltage Vr2, the output SKPOUT of the second voltage comparator 30 switches from high to low to enable the oscillator 31. Upon being enabled, the oscillator 31 outputs a single high pulse to the S input of the RS flip-flop 40, which in turn sets the Q output from low to high. In responses to the first input In going high, the switching controller 50 applies low voltage signals PHS and NLS to the gates of the corresponding transistors, thereby causing the switching transistor M1 to turn on and the synchronous rectifier transistor M2 to turn off.

The switching transistor M1 thus becoming conductive connects the input terminal IN to the inductor node LX, so that a current IL flows into the inductor L from the input terminal IN. The amount of this inductor current IL increases in proportion to a difference between the input and output voltages Vin and Vout. When the inductor current IL exceeds the current Iout output to the load circuit LOAD, charge builds up in the output capacitor Co to gradually increase the output voltage Vout, resulting in the error voltage OPOUT decreasing inversely with the output voltage Vout.

Once the voltage OPOUT falls below the second reference voltage Vr2, the output SKPOUT of the second voltage comparator 12 switches from low to high to disable the oscillator 31. Thus, the oscillator 31 does not output another pulse CLK until the error voltage OPOUT again exceeds the threshold voltage Vr2.

The status of the inductor current IL is monitored by the current/voltage converter 60. The current/voltage converter 60 generates a current-sensing voltage Vsense proportional to the inductor current IL, while the slope voltage generator 70 generates a slope compensation voltage Vslope added to the voltage Vsense to obtain a current-feedback ramp voltage Vc for comparison with the error voltage OPOUT.

During ON-time of the switching transistor M1, the ramp voltage Vc gradually increases from the ground level GND in accordance with the increase in the inductor current IL. When the ramp voltage Vc exceeds the error voltage OPOUT, the output PWMOUT of the first comparator 13 goes from low to high, causing the RS flip-flop 40 to reset the Q output from high to low. In response to the first input In going low, the switching controller 50 applies high voltage signals PHS and NLS to the gates of the corresponding transistors, thereby causing the switching transistor M1 to turn off and the synchronous rectifier transistor M2 to turn on.

When the switching transistor M1 thus shuts off, the voltage VLX at the inductor node LX becomes negative due to a counter-electromotive force developed across the inductor L. Accordingly, the current-sensing voltage Vsense proportional to the inductor current L1 falls to the ground level GND, followed by the slope voltage generator 70 deactivated to cause the slope voltage Vslope to fall to zero. This means the sum Vc of the voltages Vsense and Vslope also falls to the ground voltage GND, resulting in the pulse signal PWMOUT returning to the low level immediately after resetting the RS flip-flop 40 and turning off the switching transistor M1.

With the transistor M1 no longer connecting the input terminal IN to the inductor node LX, the inductor L draws a current IL from the ground GND through the synchronous rectifier transistor M2. The amount of this inductor current IL gradually decreases toward zero in proportion to the output voltage Vout. The output voltage Vout starts to decrease when the inductor current IL falls below the output current Iout, resulting in the error voltage OPOUT inversely increasing toward the reference voltage Vr2.

Further, when the voltage VLX at the inductor node LX becomes positive, the controller 50 outputs a low voltage signal NLS to turn off the transistor M2 irrespective of the input signal In from the RS flip-flop 40. This prevents a backflow of current from the output terminal OUT to the ground GND through the inductor L and the transistor M2 when the inductor L discharges all stored energy and the inductor current IL becomes zero, which would otherwise result in a significant reduction in the energy conversion efficiency of the DC-DC converter.

When the error voltage OPOUT reaches the second reference voltage Vr2, the DC-DC converter 100 enters another operational cycle in VFM control mode, whereupon the switching transistor M1 again turns on to resume the flow of current IL from the input terminal IN to the inductor L. Thus, during VFM-controlled operation, the DC-DC converter 1 is in discontinuous mode where the inductor current IL falls to and remains at zero during part of one operation cycle. That is, within one operational cycle of the DC-DC converter 100 in VFM mode, the inductor current IL flows during a period of time T1 where either of the output transistors M1 and M2 remains conductive, and no current flows through the inductor L during a period of time T2 where the output transistors M1 and M2 both remain shut off.

In the VFM-controlled voltage regulation described above, the smaller the output current Iout, the faster the output voltage Vout increases and the error voltage OPOUT decreases, resulting in a shorter period of time during which the switching transistor M1 remains conductive. On the other hand, the smaller the output current Iout, the slower the output voltage Vout decreases, resulting in a longer time interval and a lower switching frequency with which the switching transistor M1 switches on.

The DC-DC converter 100 switches control mode from VFM mode to PWM mode when the output current Iout increases to raise the switching frequency, maintaining the error voltage OPOUT consistently higher than the second reference voltage Vr2.

During operation in PWM mode control, the output current Iout supplied to the load circuit LOAD is relatively high, so that the error voltage OPOUT remains above the second reference voltage Vr2. Thus, the output SKPOUT of the second voltage comparator 30 remains low to cause the oscillator 31 to output a periodic pulse clock signal CLK oscillating at a constant frequency.

When the clock signal CLK goes high, the RS flip-flop 40 sets the Q output from low to high, so that the switching controller 50 causes the switching transistor M1 to turn on and the synchronous rectifier transistor M2 to turn off. This causes a current IL to flow into the inductor L from the input terminal IN. At the same time, the adder circuit 14 outputs a current-feedback ramp voltage Vc by adding a slope compensation voltage Vslope to a current-sensing voltage Vsense proportional to the inductor current IL.

When the ramp voltage Vc exceeds the error voltage OPOUT, the output PWMOUT of the first comparator 13 goes from low to high, causing the RS flip-flop 40 to reset the Q output from high to low. In response to the first input In going low, the controller 50 applies high voltage signals PHS and NLS to the gates of the corresponding transistors, thereby causing the switching transistor M1 to turn off and the synchronous rectifier transistor M2 to turn on.

With the switching transistor M1 thus shut off, the ramp voltage Vc falls to the ground voltage GND, resulting in the output PWMOUT of the first comparator 13 going from high to low. As the transistor M1 shut off no longer connects the input terminal IN to the inductor node LX, the inductor L draws a current IL from the ground GND through the synchronous rectifier transistor M2.

Before the inductor current IL falls to zero, the oscillator 31 outputs another pulse CLK so that the DC-DC converter 100 enters another operational cycle in PWM control mode. Thus, during PWM-controlled operation, the DC-DC converter 100 is in continuous mode where the inductor current IL never falls to zero during one operational cycle.

In the PWM-controlled voltage regulation described above, the greater the output current Iout, the shorter the period of time during which the switching transistor M1 remains on. In order for the DC-DC converter to smoothly change its control mode, properly setting the inductor current IL during transition from VFM mode to PWM mode is important.

Figure 3:
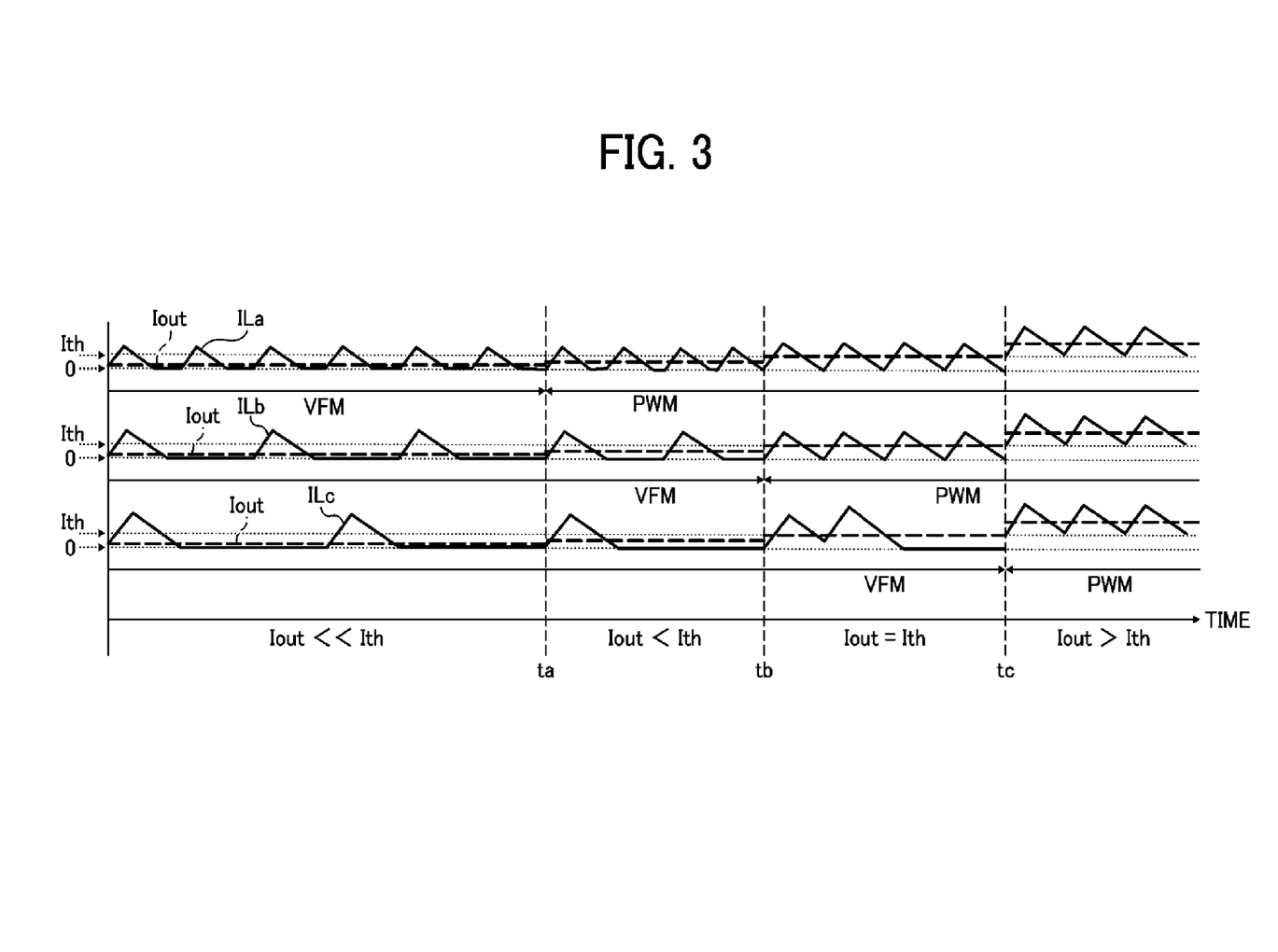
FIG. 3 shows waveforms of an inductor current in the DC-DC converter of FIG. 1 during transition from VFM mode to PWM mode.

FIG. 3 shows waveforms of the inductor current IL in the DC-DC converter 100 during transition from VFM mode to PWM mode, in which the output current Iout transitions from below to above a threshold output current Ith with which the operation mode switches from discontinuous mode to continuous mode.

In FIG. 3, the waveform ILa represents the inductor current measured when the VFM/PWM transition occurs at time to where the output current Iout is below the threshold current Ith, so that the DC-DC converter 100 operates in discontinuous mode. In this case, switching control mode from VFM to PWM abruptly raises the switching frequency of the transistor M1 and hence the energy supplied to the inductor L, resulting in a steep surge in the output voltage Vout. The abnormal rise of the output voltage Vout continues until the output current Iout is increased to the threshold current Ith so that the DC-DC converter 100 enters continuous mode operation.

The waveform ILb represents the inductor current measured when the VFM/PWM transition occurs at time tb at which the output current Iout equals the threshold current Ith, so that the DC-DC converter 100 switches operation mode from discontinuous mode to continuous mode. Under this condition, the DC-DC converter 100 can smoothly switch from VFM to PWM control mode without causing anomalies in the output voltage Vout.

The waveform ILc represents the inductor current measured when the VFM/PWM transition occurs at time tc where the output current Iout is increased above the threshold current Ith after the DC-DC converter 100 enters continuous mode operation. In this case, the switching transistor M1 controlled in VFM mode terminates one switching cycle prematurely before the inductor current ILc returns to the baseline level, resulting in the inductor current ILc becoming improperly high in the subsequent switching cycle. The improperly high inductor current ILc excessively increases the output voltage Vout to extend the duration of the switching cycle, which in turn excessively decreases the output voltage Vout.

The measurements in FIG. 3 indicate that synchronizing transition between VFM and PWM control modes with transition between discontinuous and continuous current modes is required to prevent variations in the output voltage Vout during the control mode transition. Thus, it is desirable to switch control mode between the PWM mode and the VFM mode when the output current Iout reaches the threshold current Ith with which the DC-DC converter switches operation mode between continuous mode and discontinuous mode.

In addition, for increasing power efficiency under low-load conditions, it is also desirable to reduce the switching frequency of the output transistor which is substantially proportional to the power consumed by a DC-DC converter in voltage regulation. In this regard, the DC-DC converter 100 described in FIG. 1 is less power-efficient as a VFM-controlled voltage regulator, since it reduces the amount of current supplied to the inductor L as the output current Iout decreases, resulting in a shorter switching cycle and a longer switching frequency during VFM-controlled operation.

Figure 4:
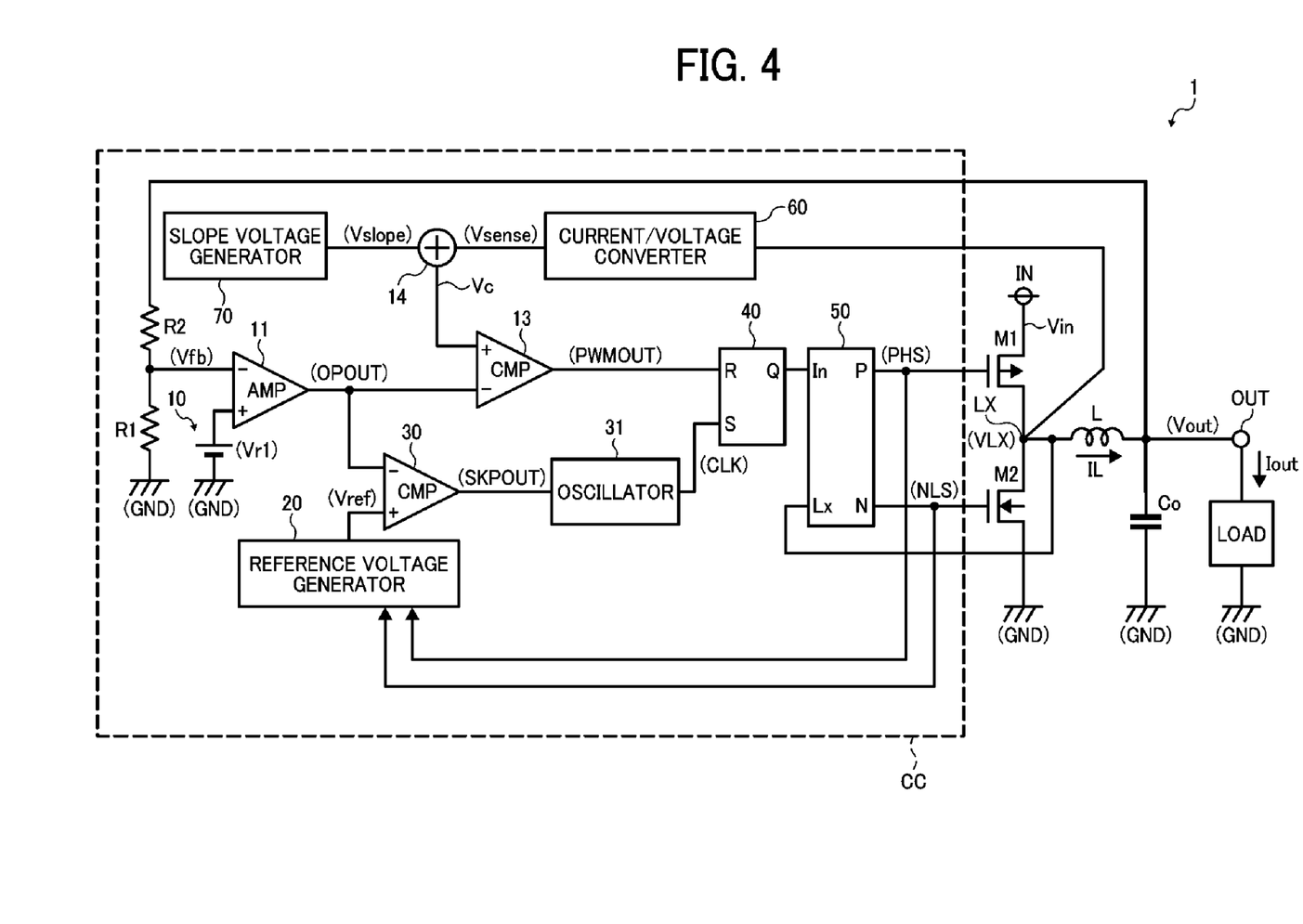
FIG. 4 is a circuit diagram illustrating a non-isolated current-mode-controlled DC-DC converter according to one embodiment of this patent specification.

FIG. 4 is a circuit diagram illustrating a non-isolated current-mode-controlled DC-DC converter 1 according to one embodiment of this patent specification.

As shown in FIG. 4, the DC-DC converter 1 is configured as a step-down or buck voltage regulator with synchronous rectification similar to that depicted in FIG. 1, except that the control circuit CC incorporates a variable reference voltage generator 20 instead of the series circuit of the constant current source I1 and the resistor R3 outputting the constant reference voltage Vr2.

Specifically, the reference voltage generator 20 has two inputs connected to the P output and the N output of the controller 50, and an output connected to the non-inverting input of the second comparator 30. During operation, the reference voltage generator 20 generates a variable reference voltage Vref for output to the second voltage comparator 30, the amplitude of which is variable depending on the switching frequency of the output transistor as indicated by the switching control signals PHS and NLS.

Figure 5:
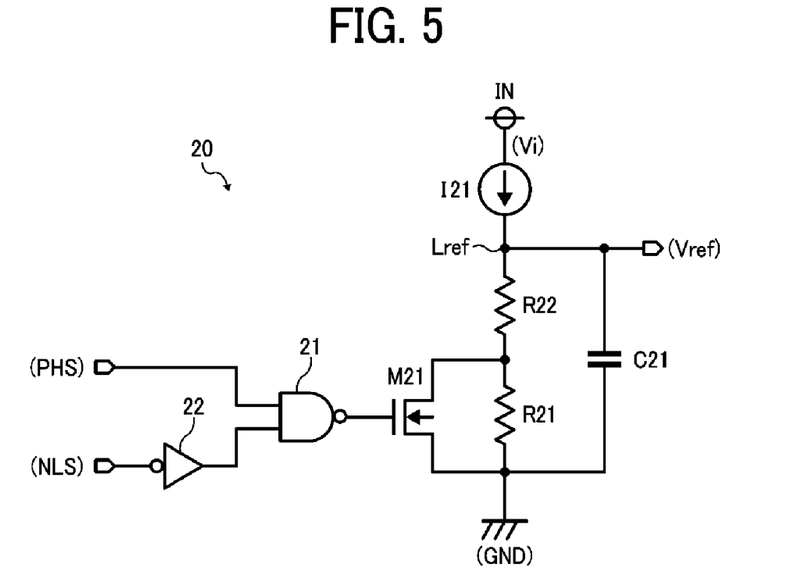
FIG. 5 is a circuit diagram illustrating internal circuitry of a variable reference voltage generator incorporated in the DC-DC converter of FIG. 4.

FIG. 5 is a circuit diagram illustrating internal circuitry of the variable reference voltage generator 20 incorporated in the DC-DC converter 1.

As shown in FIG. 5, the reference voltage generator 20 includes a logic NAND gate 21, a NOT gate or inverter 22, an NMOS transistor M21, a source I21 of a constant current i21, first and second resistors R21 and R22, and a capacitor C21.

In the reference voltage generator 20, the constant current source I21 has one terminal connected to the input terminal IN and another terminal connected to a node Lref at which the variable reference voltage Vref is generated for output to the non-inverting input of the second comparator 30.

The first and second resistors R21 and R22 are connected in series, the former having a terminal connected to the ground GND and the latter having a terminal connected to the reference output node Lref. The capacitor C21 is connected in parallel with the series resistors R21 and R22.

The NMOS transistor M21 is connected in parallel with the first resistor R21. The gate terminal of the NMOS transistor M21 is connected to an output of the NAND gate 21, and the NAND gate 21 has a first input connected to the P output of the controller 50 and a second input connected to the N output of the controller 50 via the inverter 22.

During operation, the NAND gate 21 receives the signal PHS and an inverted version of the signal NLS to output a signal to control switching of the NMOS transistor M21. According to the NAND logic function, the output of the NAND gate 21 goes low only when the signal PHS is high and the signal NLS is low, and otherwise remains high.

When the NAND gate output is low, the NMOS transistor M21 turns off to cause the constant current i21 to flow through both the first and second resistors R21 and R22. At this point, the reference voltage generator 20 generates a maximum reference voltage $Vref_{max}$ at the node Lref as given by the following Equation 1:

$$Vref_{max} = (R21+R22)*i21 \quad \text{Eq. 1}$$

When the NAND gate output is high, the NMOS transistor M21 turns on to short the first resistor R21, causing the constant current i21 to flow only through the second resistor R22. At this point, the reference voltage generator 20 generates a minimum reference voltage $Vref_{min}$ at the node Lref as given by the following Equation 2:

$$Vref_{min} = R22*i21 \quad \text{Eq. 2}$$

Referring back to FIG. 2, within one operational cycle of the DC-DC converter 1, the inductor current IL flows during the time period T1 where the switching control signals PHS and NLS remain at the same logic level, either high or low, to turn on either one of the transistors M1 and M2, and no inductor current flows during the time period T2 where the signal PHS goes high and the signal NLS low to shut off both of the switching transistors M1 and M2.

Thus, the output of the NAND gate 21 alternates in time as the flow of inductor current IL stops and resumes within one operational cycle of the DC-DC converter 1 operating in discontinuous mode. Nevertheless, the output of the reference voltage generator 20 does not hover between the maximum and minimum limits $Vref_{max}$ and $Vref_{min}$ owing to the capacitor C21 exhibiting an integrating effect.

Specifically, the output reference voltage Vref is determined at a stable point between $Vref_{max}$ and $Vref_{min}$ according to the proportion of the period of time during which the NAND output is high (or low) and the NMOS transistor M21 conducts (or shuts off), corresponding to the period of time during which inductor current IL flows (or stops flowing). Considering this, the equations Eqs. 1 and 2 can be rewritten into Equation 3 below as follows, which represents a reference voltage Vref varying depending on the proportion of the time period P2 within one operational cycle of the DC-DC converter 1:

$$Vref = \{R21*T2/(T1+T2)+R22\}*i22 \quad \text{Eq. 3}$$

As can be seen from FIG. 2, the proportion of the period T2 in one operational cycle decreases as the switching frequency increases, and becomes zero when the DC-DC converter 1 enters continuous operation mode where the transistors M1 and M2 no longer simultaneously shut off.

Assuming that the time period T1 does not change significantly, larger values of T2 result in the reference voltage Vref closer to the maximum limit $Vref_{max}$ as defined by the Equation 1, and smaller values of T2 result in the reference voltage Vref closer to the minimum limit $Vref_{min}$ as defined by the Equation 2. In particular, substituting 0 for T2 in the Equation 3 yields a reference voltage Vref exactly equal to the minimum reference voltage $Vref_{min}$.

Figure 6:
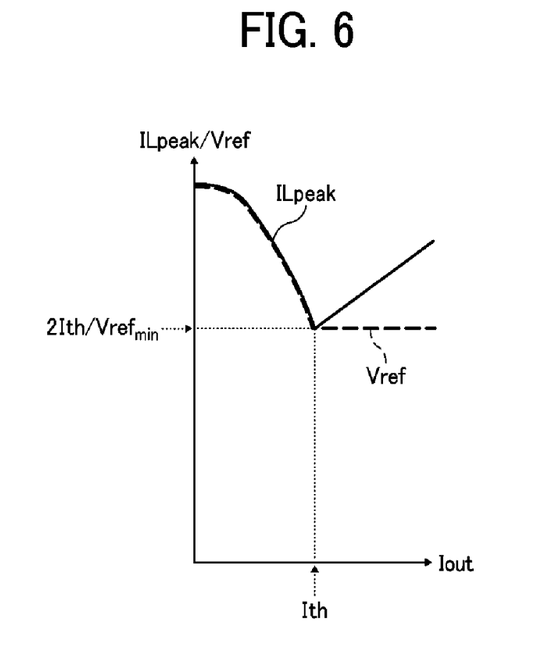
FIG. 6 is a graph plotting a reference voltage and a peak value of an inductor current each against an output voltage of the DC-DC converter of FIG. 4.

FIG. 6 is a graph plotting the reference voltage Vref (dotted line) and the peak value iLpeak of the inductor current iL (solid line) each against the output current Iout of the DC-DC converter 1.

As shown in FIG. 6, the reference voltage Vref decreases as the output current Iout increases toward the threshold output current Ith, and reaches the minimum limit $Vref_{min}$ when the output current Iout equals Ith. Similar to the reference voltage Vref, the inductor peak current ILpeak decreases as the output current Iout increases toward the threshold current Ith, and reaches a minimum value of 2*Ith (obtained by multiplying Ith by a factor of 2) when the output current Iout equals Ith.

When the output current Iout exceeds the threshold current Ith, indicating transition from VFM-controlled operation to PWM-controlled operation, the inductor peak current ILpeak increases in proportion to the output current Iout, whereas the reference voltage Vref remains at the minimum limit $Vref_{min}$ irrespective of the output current Iout.

The similarities between the curves of the reference voltage Vref and the inductor peak current ILpeak reflect the fact that during VFM-controlled operation the amplitude of the second reference voltage Vref regulates the amount of current supplied to the inductor L per one operational cycle. That is, a higher second reference voltage Vref means an increase in the error voltage OPOUT at which the first comparator 13 switches its output PWMOUT, and in the ramp voltage Vc compared against the error voltage OPOUT. This allows more inductor current IL to flow until the signal PWMOUT is pulsed to switch off the switching transistor M1, resulting in an increased amount of total current supplied to the inductor IL per one operational cycle.

Additionally, in the DC-DC converter 1 according to this patent specification, transition from VFM control mode to PWM control mode occurs when the output current Iout is at the threshold output current Ith. This configuration is achieved by adjusting the reference voltage Vref so that the output SKPOUT of the second comparator 30 is low whenever the inductor peak current ILpeak is twice the output current Iout.

The circuitry of the DC-DC converter 1 may have a polarity opposite to that described in FIG. 4, in which case an explanation of the behavior of the variable reference voltage Vref is obtained by replacing "maximum" with "minimum" and vice versa in the description provided above with reference to FIGS. 5 and 6.

Figure 7:
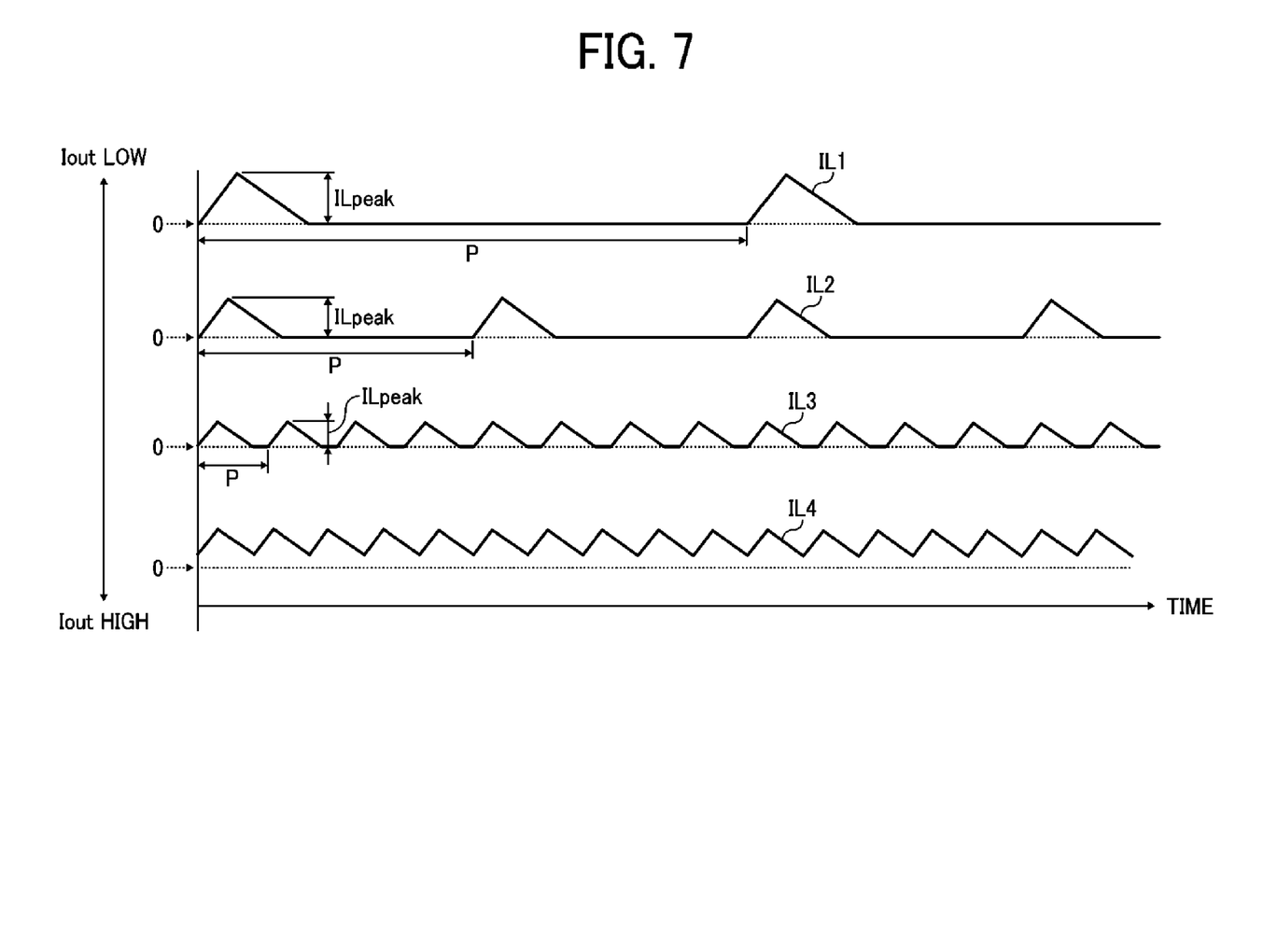
FIG. 7 shows waveforms of the inductor current of the DC-DC converter of FIG. 4 in ascending order of an output current with which they are obtained.

FIG. 7 shows waveforms of the inductor current IL of the DC-DC converter 1 in ascending order of the output current Iout with which they are obtained, in which the upper three examples IL1 through IL3 are measured during VFM-controlled operation and the last one IL4 is measured during PWM-controlled operation.

As shown in FIG. 7, the inductor currents IL1 through IL3 flowing during VFM-controlled operation are discontinuous whereas the inductor current IL4 flowing during PWM-controlled operation is continuous. A comparison between the discontinuous waveforms IL1 through IL3 indicates that during VFM-controlled operation, the peak amplitude ILpeak of the inductor current as well as the total amount of current supplied to the inductor L per one operational cycle increase as the output current Iout decreases in the DC-DC converter 1.

It is to be noted that the length P of one operational cycle significantly increases with the decreasing inductor current IL, implying a corresponding reduction in the switching frequency and a concomitant reduction in the amount of power consumed by switching the output transistor. Except for some increase in output ripples caused by increasing inductor current, this leads to improved operation of the DC-DC converter 1 under low-load conditions.

Thus, the DC-DC converter 1 according to this patent specification can smoothly switch control mode from VFM to PWM without causing variations in the output voltage by adjusting the reference voltage Vref so that the output current Iout is half the peak inductor current ILpeak upon transition of the control mode.

Further, the DC-DC converter 1 effectively reduces the switching frequency and the power consumed by the switching transistor by increasing the current supplied to the inductor per one operational cycle during VFM-controlled operation.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application No. JP-2008-234362 filed on Sep. 12, 2008 in the Japanese Patent Office, the entire contents of which are hereby incorporated by reference herein.

What is claimed is:

1. A non-isolated DC-DC converter that converts a voltage input to an input terminal to output a constant output voltage to a load terminal while switching control mode between a PWM mode and a VFM mode depending on a current output to the load terminal, the DC-DC converter comprising:
    an inductor to store electric energy for supply to the load terminal;
    a switching circuit to switch on and off current flow at a switching frequency to alternately charge and discharge the inductor; and
    a control circuit to increase an electric current flowing to the load terminal through the inductor per one operational cycle as the switching frequency decreases during VFM control mode operation,
    wherein the switching circuit includes an output transistor switched on and off by the control circuit, and the control circuit includes:
    an error amplifier to amplify a difference between a first reference voltage and the output voltage to output an error voltage indicating the amplified voltage difference;
    a reference voltage generator to generate a variable reference voltage according to the switching frequency;
    a first comparator to compare the error voltage and the reference voltage to output an enable signal;
    an oscillator to output a clock signal oscillating according to the enable signal;
    a current/voltage converter to generate an inductor voltage based on the current flowing through the inductor;
    a slope voltage generator to generate a slope compensation voltage;
    an adder to add the slope compensation voltage to the inductor voltage to output a current feedback voltage; and
    a second comparator to compare the error voltage and the current feedback voltage to output a pulsed modulation signal,
    the control circuit causing the output transistor to turn on in response to the oscillating clock signal, and to turn off in response to the pulsed modulation signal.

2. The DC-DC converter according to claim 1, wherein the control circuit switches control mode between the PWM mode and the VFM mode as the current flowing through the inductor per operational cycle reaches a threshold current with which the DC-DC converter switches operation mode between a continuous current mode and a discontinuous current mode.

3. The DC-DC converter according to claim 1, wherein the current flowing through the inductor per one operational cycle has an upper limit during VFM control mode operation.

4. The DC-DC converter according to claim 1, wherein the reference voltage generator outputs a minimum reference voltage when the DC-DC converter enters a continuous current mode from a discontinuous current mode, and outputs a maximum reference voltage when the current flowing through the inductor per one operational cycle reaches an upper limit during VFM control mode operation.

5. The DC-DC converter according to claim 1, wherein the reference voltage generator outputs a maximum reference voltage when the DC-DC converter enters a continuous current mode from a discontinuous current mode, and a minimum reference voltage when the current flowing through the inductor per one operational cycle reaches an upper limit during VFM control mode operation.

6. The DC-DC converter according to claim 1, wherein the reference voltage generator includes:
    a constant current source to supply a constant current;
    a pair of resistors connected in series with the constant current source;
    a capacitor connected in parallel with the pair of resistors to generate the reference voltage thereacross; and
    a switch connected in parallel with one of the pair of resistors to increase the reference voltage to vary the reference voltage by turning on and off current flow therethrough,
    the reference voltage generator increasing a proportion of time during which the switch remains off within one operational cycle to increase the reference voltage as the switching frequency decreases.

7. The DC-DC converter according to claim 6, wherein the switch remains off when no current flows through the inductor during discontinuous current mode operation.

* * * * *